United States Patent [19]
Oogo et al.

[11] Patent Number: 6,037,099
[45] Date of Patent: Mar. 14, 2000

[54] OPTICAL DISK

[75] Inventors: Takashi Oogo, Yokosuka; Junichi Iimura, Ebina, both of Japan

[73] Assignee: Victor Company of Japan Ltd., Yokohama, Japan

[21] Appl. No.: 08/866,361

[22] Filed: May 30, 1997

[30] Foreign Application Priority Data

May 31, 1996 [JP] Japan ................................. 8-160803

[51] Int. Cl.$^7$ ...................................................... G11B 7/24
[52] U.S. Cl. .................. 430/270.11; 430/945; 428/65.2; 369/288; 369/286
[58] Field of Search ................................ 430/270.1, 945, 430/270.11; 428/65.2; 369/288, 286

[56] References Cited

U.S. PATENT DOCUMENTS

| | | | |
|---|---|---|---|
| 4,711,798 | 12/1987 | Ueda et al. | 430/270.15 |
| 4,990,208 | 2/1991 | Kano | 156/275.3 |
| 5,219,708 | 6/1993 | Hirata et al. | 430/945 |
| 5,360,652 | 11/1994 | Kobayashi et al. | 430/270.11 |
| 5,540,967 | 7/1996 | Toide et al. | 428/65.2 |
| 5,540,988 | 7/1996 | Tachibana et al. | 428/323 |
| 5,764,619 | 6/1998 | Nishiuchi et al. | 369/275.1 |
| 5,824,385 | 10/1998 | Itoigawa et al. | 430/945 |

FOREIGN PATENT DOCUMENTS

| | | |
|---|---|---|
| 0 390 413 | 10/1990 | European Pat. Off. . |
| 0 725 396 | 8/1996 | European Pat. Off. . |
| 61-214245 | 9/1986 | Japan . |
| 2-162546 | 6/1990 | Japan . |
| 6295470 | 10/1994 | Japan . |
| 9017034 | 1/1997 | Japan . |
| 9097451 | 4/1997 | Japan . |

*Primary Examiner*—Martin Angebranndt
*Attorney, Agent, or Firm*—Eugene Lieberstein; Michael N. Meller

[57] ABSTRACT

Opposed faces of two disk substrates are bonded by an adhesive layer whose characteristic parameters are set in predetermined ranges, particularly in the values of a product of Young's modulus and the film thickness in a range of $1.0\times10^{-2}$ kg/mm to 3.0 kg/mm, a product of Young's module and the thermal expansion coefficient in a range not larger than $1.5\times10^{-2}$ kg·mm$^{-2}$·°C.$^{-1}$, or a product of the thermal expansion coefficient and the film thickness in a range not larger than $2.0\times10^{-5}$ mm /° C. Preferably, the glass transition point of the used adhesive is set to a value in a range of 20° C. to 80° C., and the film thickness is set to a value in a range of 10 μm to 100 μm.

6 Claims, 9 Drawing Sheets

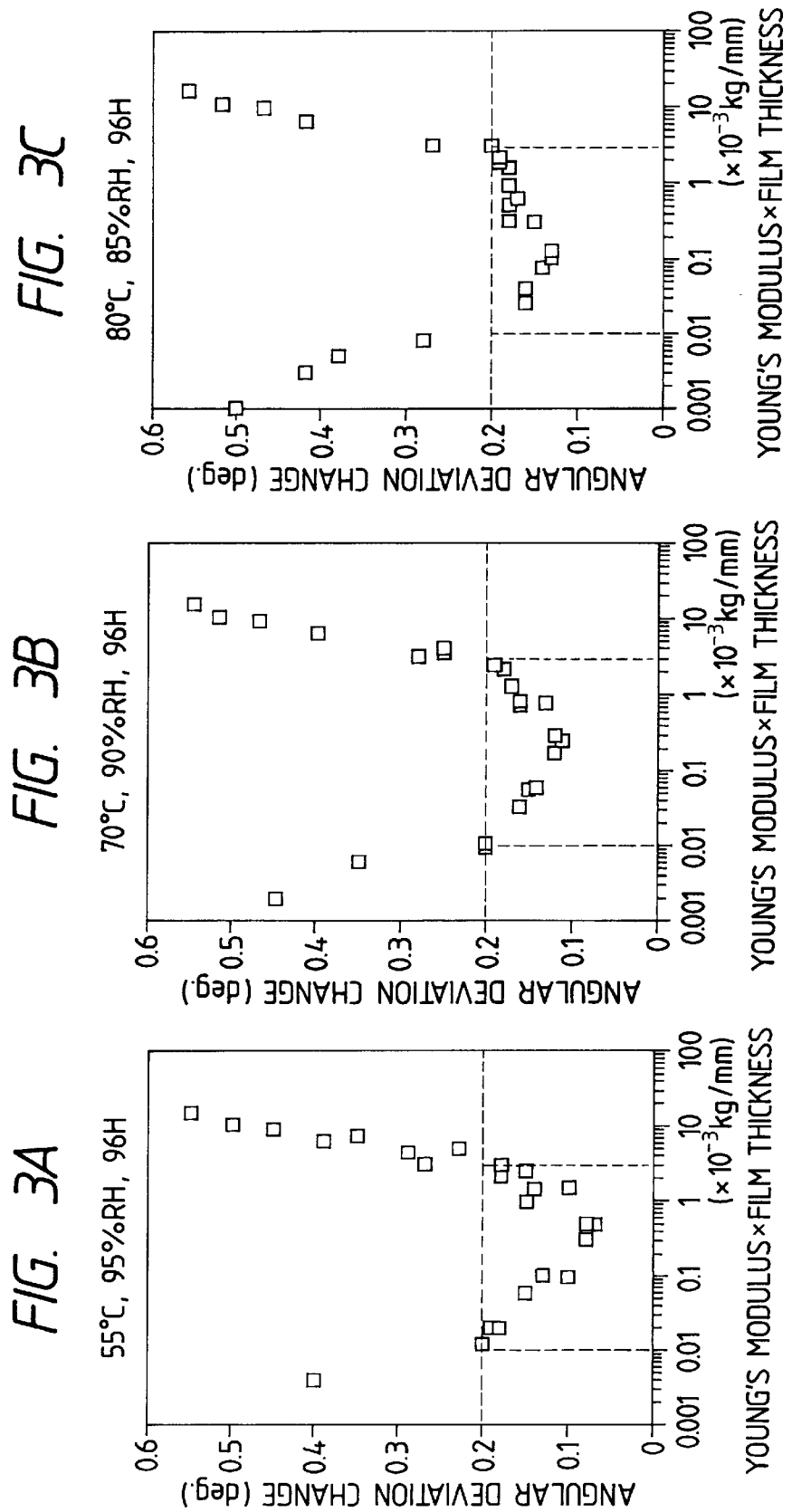

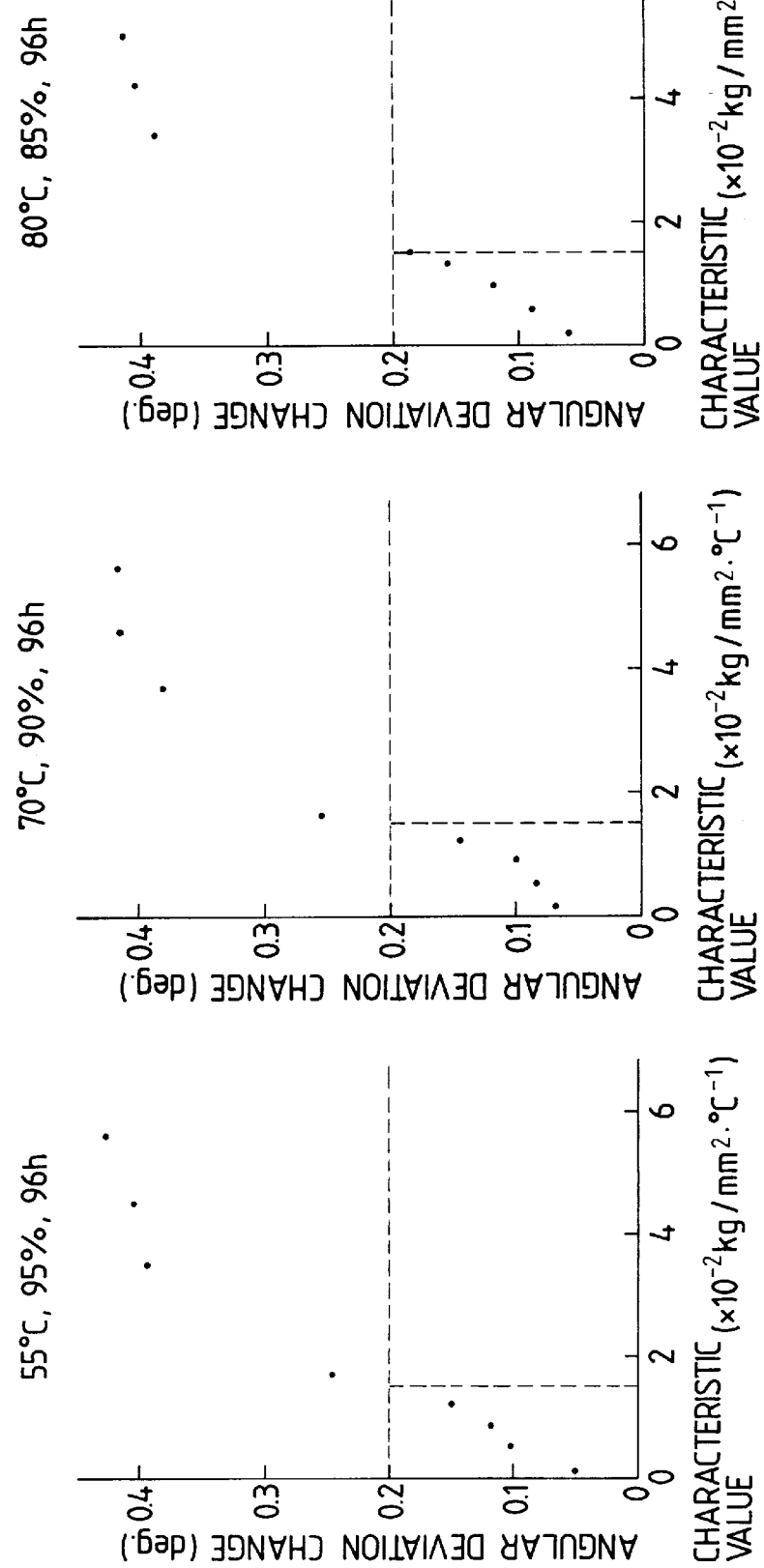
FIG. 4A  55°C, 95%, 96h
FIG. 4B  70°C, 90%, 96h
FIG. 4C  80°C, 85%, 96h

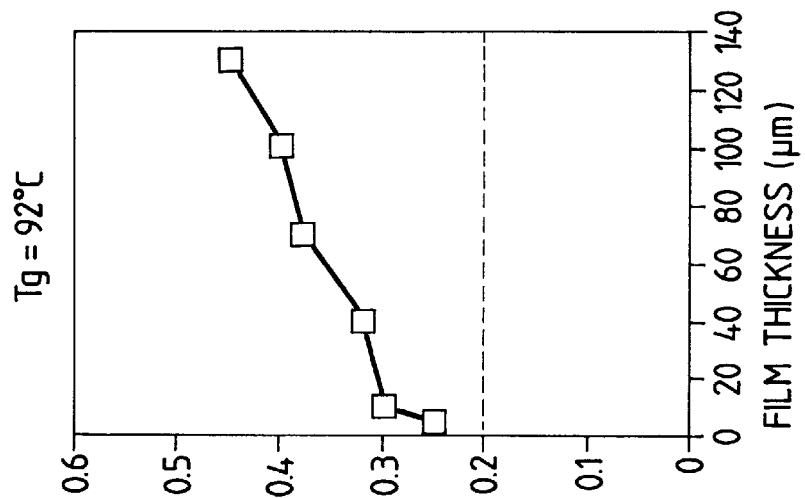
FIG. 6D  Tg = 61°C
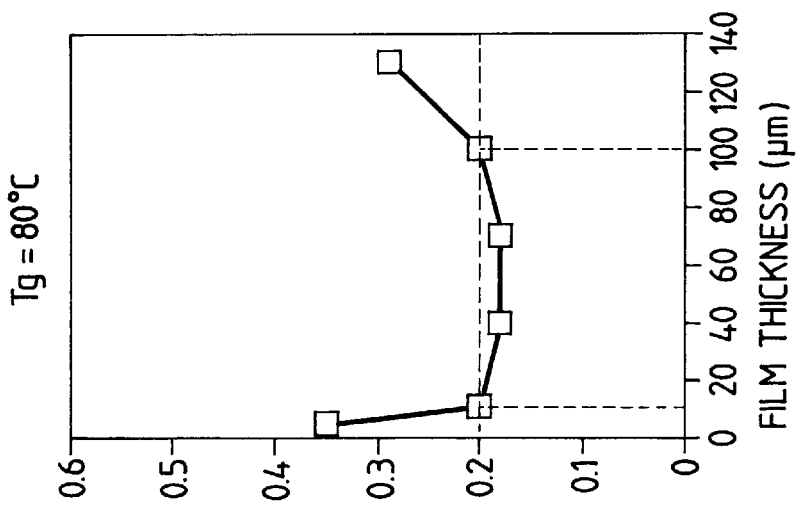
FIG. 6E  Tg = 80°C
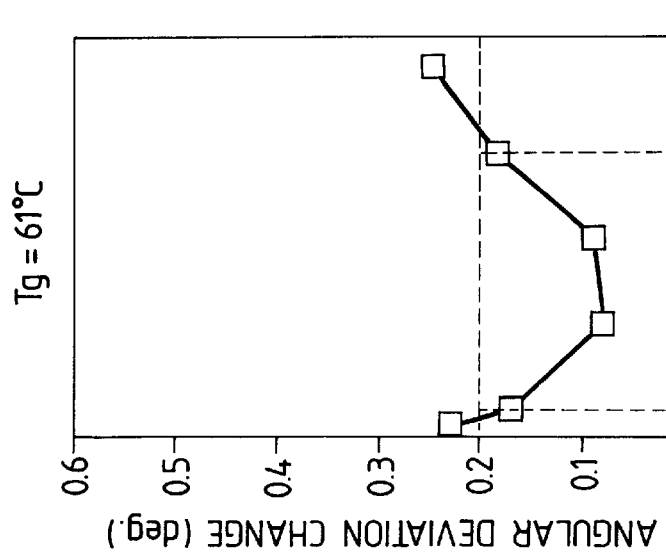
FIG. 6F  Tg = 92°C

OPTICAL DISK

BACKGROUND OF THE INVENTION

1. Field of the Invention

The present invention relates to optical disks, and more particularly to bonded-type optical disks excellent in the life quality.

2. Prior Art

In general, an optical disk comprising two substrates, each having a recording layer or a reflective layer on its surface, is advantageous in that a recording capacity is large and is widely used as a video disk, a digital audio disk, or a document or data file disk. FIG. 9 is a perspective cross-sectional view schematically showing a conventional bonded-type optical disk. FIGS. 10A and 10B show schematic cross sections of the bonded disks constituting a bonded-type optical disk. More specifically, a conventional bonded-type optical disk 30 comprises a light-permeable substrate 9 having a thickness of about 1.2 mm. Signal pits or tracking grooves are formed on one surface of the substrate 9. A recording layer 10 is provided on the signal-pit or tracking-groove formed surface of the substrate 9. A protection film 11 is provided on the recording layer 10 if necessary. FIG. 10A shows a double-sided optical disk for use in both of the recording and the reproduction. Two substrates 9, each being provided with the recording layer 10, are bonded at their opposing faces via an adhesive layer 12. Their recording layers 10 are interposed between the opposing substrates 9. FIG. 10B shows a single-sided optical disk for use in both of the recording and the reproduction characterized by the structural features that only one of two substrates 9 is provided with the recording layer 10.

The substrate 9 made of a light-permeable material, such as an optical glass, an acrylic resin, a polycarbonate resin, and an amorphous polyolefine resin. The recording layer 10 is made of a photoelectromagnetic recording material, such as TbFe, GdCo, GdTbFe and MnCuBi, or a phase-change recording material, such as As—Te—Ge group and Sn—Te—Se group, which are basically or rewritable materials, or made of a write-once type material represented by a cyanine group or a phthalocyanine group material, otherwise made of an Al-group, Cu-group or Ag-group reflective layer for a reproduction-only type disk on a substrate of which signal pits are formed beforehand. The protection film 11 is chiefly made of a ultraviolet hardening resin. The adhesive layer 12 is chiefly made of a hotmelt-type adhesive and a ultraviolet hardening type adhesive (referred to UV adhesive, hereinafter).

A problem always occurring in handling optical disks is a deviation of the disk. The above-described bonded-type optical disks are not exception in that they are subjected to this problem too. The conventional bonded-type optical disk, as described above, has the structural features that two substrates, each having a thickness of about 1.2 mm, are bonded directly or via a spacer. In addition, a recent trend toward high densification forces the optical disks to reduce the thickness of their substrates. Reduction in the thickness of the substrate leads to the reduction of the rigidity of the optical disk. This is disadvantageous in eliminating the deviation. Especially, for a one-sided recording/reproduction type optical disk (shown in FIG. 10B), there is a tendency that a large deviation is produced due to its structural unbalance or asymmetry. As another factor causing such a deviation is the characteristic parameters of an adhesive used for bonding the substrates.

For example, an adhesive used in a conventional bonded-type optical disk is the type PS450-20 commercially available from ACI JAPAN LTD. A sample of the one-sided recording/reproduction type optical disk using PS450-20 is experimentally fabricated by bonding 0.6 mm thick polycarbonate substrates by this adhesive PS450-20. The fabricated optical disk is then subjected to an environmental test under the condition of the temperature 55° C., humidity 95% and 96 hours. After finishing the environmental test, a time-sequential change in the deviation of the tested disk is measured. FIG. 8 shows the result of the measurement. As apparent from FIG. 8, the deviation of the tested disk varied about 1.0 degree before and after the environmental test.

Other hotmelt-type adhesive conventionally used is, for example, the type PS450-56 commercially available from ACI JAPAN LTD., the type PPET-2101 commercially available from TOAGOSEI CO., LTD., or other EVA group or olefine-group adhesives. The similar environmental tests were conducted on these adhesives, and it was found that a large deviation was caused in the same manner.

Other conventional adhesives, used as UV adhesives, are ARONIX UV-3610, 3810, M-210, M-240, M-1100, M-1200, M-1400, M-6100, M-6200, M-6250, and M-6300 commercially available from TOAGOSEI CO.LTD., cyclohexyl (metha) acrylate, poly(ethylene glycol)~(metha) acrylate, 1.6-hexanediol~di (metha) acrylate, neopentyl glycol~di (metha) acrylate, hydroxy pivallic acid neopentyl glycol~di (metha) acrylate, EO modified bisphenol A diacrylate, and isobornyl (metha) acrylate. These adhesive materials are similar to the hotmelt-type adhesives in that a large deviation is caused.

As described above, conventional bonded-type optical disks cause a large change in the angular deviation when the operating environments are suddenly changed. In accordance with the requirement of high densification, a margin of the player to the deviation of a disk is becoming small. Furthermore, there is a tendency that the optical disks are preferably adopted to the peripheral devices of a computer. Thus, the environmental durability of the optical disk needs to be further improved to endure severe operating conditions.

SUMMARY OF THE INVENTION

In view of the foregoing, an object of the present invention is to provide a novel bonded-type optical disk having excellent life quality capable of effectively minimizing a deviation or distortion even in the hard or severe environments such as a hot and humid condition. To attain this goal, the present invention sets a practical target that a deformation of the optical disk due to the environmental changes needs to be suppressed within 0.2 degrees in the angular deviation.

To accomplish this and other related objects, the present invention provides an optical disk comprising two opposed transparent substrates bonded by an adhesive layer interposed therebetween. A product of two parameters representing characteristics of an adhesive used in the adhesive layer, or each of the two parameters, is within a predetermined range corresponding to a change of 0.2 degree in an angular deviation of the optical disk.

More specifically, the present invention provides an optical disk comprising two opposed transparent substrates bonded by an adhesive layer interposed therebetween, wherein these two opposed transparent substrates are constituted by a combination of one transparent substrate having an information recording layer of a metallic film or organic dye formed on an upper surface thereof and other transparent substrate having no information recording layer on an upper surface thereof, or constituted by a combination of two transparent substrates each having an information recording layer of a metallic film or organic dye formed on an upper surface thereof, so that the information recording layer is sandwiched between the opposed transparent substrates, characterized in that a product of Young's modulus of an adhesive used for bonding the opposed transparent substrates and a film thickness of the adhesive layer is in a range of $10 \times 10^{-2}$ kg/mm to $3.0 \times 10^2$ kg/mm.

Another aspect of the present invention provides an optical disk comprising two opposed transparent substrates bonded by an adhesive layer interposed therebetween, wherein these two opposed transparent substrates are constituted by a combination of one transparent substrate having an information recording layer of a metallic film or organic dye formed on an upper surface thereof and other transparent substrate having no information recording layer on an upper surface thereof, or constituted by a combination of two transparent substrates each having an information recording layer of a metallic film or organic dye formed on an upper surface thereof, so that the information recording layer is sandwiched between the opposed transparent substrates, characterized in that a product of a thermal expansion coefficient and Young's modulus of an adhesive used for bonding the opposed transparent substrates is in a range not larger than $1.5 \times 10^{-2}$ kg·mm$^{-2}$·°C.$^{-1}$.

Furthermore, another aspect of the present invention provides an optical disk comprising two opposed transparent substrates bonded by an adhesive layer interposed therebetween, wherein these two opposed transparent substrates are constituted by a combination of one transparent substrate having an information recording layer of a metallic film or organic dye formed on an upper surface thereof and other transparent substrate having no information recording layer on an upper surface thereof, or constituted by a combination of two transparent substrates each having an information recording layer of a metallic film or organic dye formed on an upper surface thereof, so that the information recording layer is sandwiched between the opposed transparent substrates, characterized in that a product of a thermal expansion coefficient of an adhesive used for bonding the opposed transparent substrates and a film thickness of the adhesive layer is in a range not larger than $2.0 \times 10^{-5}$ mm /°C.

Yet further, another aspect of the present invention provides an optical disk comprising two opposed transparent substrates bonded by an adhesive layer interposed therebetween, wherein these two opposed transparent substrates are constituted by a combination of one transparent substrate having an information recording layer of a metallic film or organic dye formed on an upper surface thereof and other transparent substrate having no information recording layer on an upper surface thereof, or constituted by a combination of two transparent substrates each having an information recording layer of a metallic film or organic dye formed on an upper surface thereof, so that the information recording layer is sandwiched between the opposed transparent substrates, characterized in that a glass transition point of an adhesive used for bonding the opposed transparent substrates is in a range of 20° C. to 80° C. and a film thickness of the adhesive layer is in a range of 10 μm to 100 μm. Preferably, a mean gradient in a thermal variation of Young's modulus of the adhesive is not smaller than $-1.0$ kg/mm$^2$/°C.

BRIEF DESCRIPTION OF THE DRAWINGS

The above and other objects, features and advantages of the present invention will become more apparent from the following detailed description which is to be read in conjunction with the accompanying drawings, in which:

FIGS. 3A to 3C are graphs showing the resultant angular deviation changes in relation to the product of Young's modulus and the film thickness, for adhesives used in bonded-type optical disks;

FIGS. 4A to 4C are graphs showing the resultant angular deviation changes in relation to the product of Young's modulus and the thermal expansion coefficient, for adhesives used in bonded-type optical disks;

FIGS. 6A to 6F are graphs showing the resultant angular deviation changes in relation to the film thickness of the adhesive layer in a bonded-type optical disk;

DESCRIPTION OF THE PREFERRED EMBODIMENTS

Figure 1:
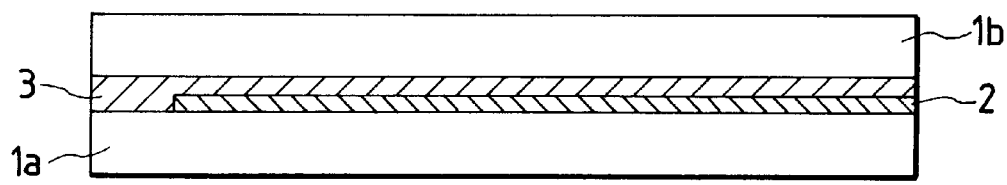
FIG. 1 is a cross-sectional view showing an optical recording disk in accordance with a first embodiment of the present invention.

Preferred embodiments of the present invention will be explained with reference to the accompanying drawings. Identical parts are denoted by the same reference numerals throughout the views.

First Embodiment

FIG. 1 is a cross-sectional view showing an optical recording disk in accordance with a first embodiment of the present invention. A transparent polycarbonate substrate 1a, having a thickness of 0.6 mm and formed by an injection molding, has a surface on which signal pits are formed. An aluminum reflective layer 2, having a thickness of about 700 angstrom, is formed or accumulated on the signal-pit formed surface of the transparent polycarbonate substrate 1a by a sputtering method. The disk, comprising the aluminum reflective layer 2 thus mounted on the transparent polycarbonate substrate 1a, is prepared beforehand for assembling this disk with another disk. An adhesive 3 is dropped, by an amount of about 3 g, on an upper surface of the reflective layer 2 along a circular line having a radius of about 40 mm. Another transparent substrate 1b, having no reflective layer and no protecting layer, is placed or mounted on the adhesive-applied surface of the reflective layer 2. Immediately after finishing this mounting operation, the integrated disk unit is rotated at a speed of 500 to 4,000 rpm for a time of 2 to 60 seconds, to expand the adhesive 3 entirely along the connecting surfaces of the disk unit. Subsequently, the disk unit is subjected to a 5-second irradiation of ultraviolet ray applied from the substrate 1b side by a high-pressure mercury lamp of 100 W/cm. This irradiation of ultraviolet ray hardens the adhesive 3 and, as a result, obtains a bonded-type optical disk 10 for use in reproduction only.

TABLE 1

| Adhesive type | Young's modulus (kg/mm²) 55° C. | 70° C. | 80° C. | Film thickness (μm) | Angular deviation change (deg.) condition #1 | condition #2 | condition #3 |
|---|---|---|---|---|---|---|---|
| A1 | 0.4 | 0.2 | 0.1 | 10 | 0.40 | 0.45 | 0.50 |
|    |     |     |     | 30 | 0.20 | 0.35 | 0.42 |
|    |     |     |     | 50 | 0.19 | 0.20 | 0.38 |
| B1 | 2.0 | 1.1 | 0.8 | 10 | 0.18 | 0.20 | 0.28 |
|    |     |     |     | 30 | 0.15 | 0.16 | 0.16 |
|    |     |     |     | 50 | 0.10 | 0.15 | 0.16 |
| C1 | 10.5 | 5.8 | 2.5 | 10 | 0.13 | 0.14 | 0.16 |
|    |     |     |     | 30 | 0.08 | 0.12 | 0.14 |
|    |     |     |     | 50 | 0.08 | 0.12 | 0.13 |
| D1 | 50.2 | 25.2 | 10.1 | 10 | 0.07 | 0.11 | 0.13 |
|    |      |      |      | 30 | 0.10 | 0.13 | 0.15 |
|    |      |      |      | 50 | 0.15 | 0.17 | 0.18 |
| E1 | 150 | 72.0 | 30.5 | 10 | 0.14 | 0.16 | 0.18 |
|    |     |      |      | 30 | 0.29 | 0.18 | 0.18 |
|    |     |      |      | 50 | 0.35 | 0.25 | 0.18 |
| F1 | 100 | 80.0 | 60.0 | 10 | 0.15 | 0.16 | 0.17 |
|    |     |      |      | 30 | 0.18 | 0.19 | 0.19 |
|    |     |      |      | 50 | 0.23 | 0.25 | 0.20 |
| G1 | 215 | 210 | 208 | 10 | 0.18 | 0.18 | 0.19 |
|    |     |     |     | 30 | 0.39 | 0.40 | 0.42 |
|    |     |     |     | 50 | 0.50 | 0.52 | 0.52 |
| H1 | 310 | 308 | 305 | 10 | 0.27 | 0.28 | 0.27 |
|    |     |     |     | 30 | 0.45 | 0.47 | 0.47 |
|    |     |     |     | 50 | 0.55 | 0.55 | 0.56 |

Various bonded-type optical disks, each having the arrangement shown in FIG. 1, were fabricated by changing the film thickness as a parameter, using UV hardening adhesives A1–H1 listed in table 1 each of which has a different Young's modulus value variable dependent on material and temperature. An angular deviation of each optical disk was measured at a room temperature (20° C.). Then, each optical disk was subjected to three kinds of environmental tests shown in table 1: condition #1 (temperature 55° C., humidity 95%, and 96 hours); condition #2 (temperature 70° C., humidity 90%, and 96 hours); and condition #3 (temperature 80° C., humidity 85%, and 96 hours). After finishing each environmental test, each disk was left alone for 24 hours under a condition of temperature 25° C. and humidity 50%. Then, the angular deviation of each disk was measured again to identify a change in the angular deviation before and after each environmental test. A measuring device used for measuring the angular deviation is the type SH-3DL-12N of ADOMONT SCIENCE CO. which has a measuring level for the angular deviation regulated in compliance with JIS S 8605.

The deviation change amount was measured at the outermost position (i.e., at a radial position equivalent to the radius 58 mm) of each disk because the change of the angular deviation is maximized at the outermost position. The Young's modulus was measured in the following manner. Each adhesive, formed into a rectangular shape of 4 mm wide, 30 mm long, and 50 μm thick, was subjected to a tensile stress of 15±5 g under a heated condition. The relationship between an applied stress and a resultant deviation or deflection during this tensile test is measured by a thermal stress strain gauge (Type TMA/SS10 of SEIKO ELECTRON CO., LTD.). The Young's modulus of each adhesive sample is calculated based on the thus-identified relationship. In this case, the film thickness was controlled by adjusting the spinnig speed and time.

Table 1 and FIGS. 3A–3C cooperatively show the result of angular deviation changes obtained through the above-described environmental tests. FIGS. 3A to 3C are graphs showing the data of table 1. As described previously, an acceptable deviation or distortion of the disk due to environmental changes is not larger than 0.2 degree in the angular deviation. To satisfy a requirement that any possible change is suppressed within 0.2 degree in angular deviation, it is confirmed from FIGS. 3A to 3C that a product of Young's modulus and the film thickness, as one of characteristic values representing an adhesive, needs to be in a range of $1.0 \times 10^{-2}$ kg/mm to 3.0 kg/mm.

Second Embodiment

Figure 2:
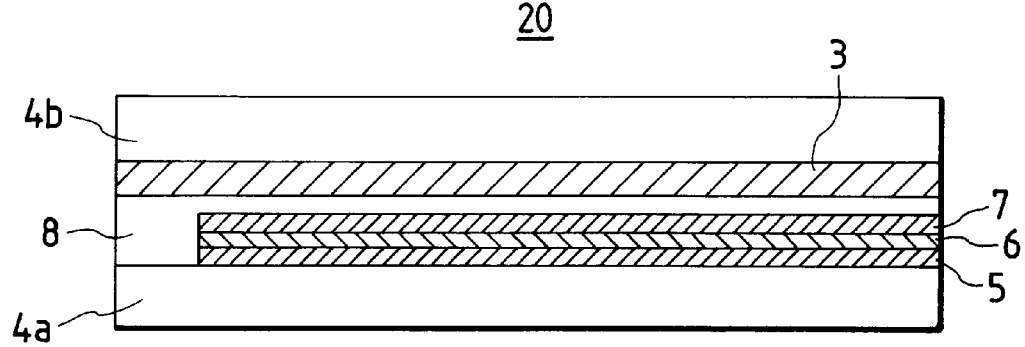
FIG. 2 is a cross-sectional view showing another optical recording disk in accordance with a second embodiment of the present invention.

FIG. 2 is a cross-sectional view showing an optical recording disk in accordance with a second embodiment of the present invention. A transparent polycarbonate substrate 4a, having a thickness of 0.6 mm and formed by an injection molding, has a surface on which tracking grooves are formed. A first dielectric protection layer 5 of a silicon nitride film, having a thickness of about 900 angstrom, is formed or accumulated on the tracking-grove formed surface of the transparent polycarbonate substrate 4a by a sputtering method. A recording layer 6 of a TbFeCo film, having a thickness of about 1,000 angstrom, is formed or accumulated on the first dielectric protection layer 5. A second dielectric protection layer 7 of a silicon nitride film, having a thickness of about 900 angstrom, is formed or accumulated on the recording layer 6. An UV protection layer 8, e.g. the type SD-17 of DAINIPPON INK & CHEMICALS, INC., having a thickness of about 10 μm, is formed or accumulated on the second dielectric protection layer 7 by a spin coat method. The substrate 4a with the recording layer 6 is bonded via an adhesive layer 3 with another transparent substrate 4b having no recording layer and no protecting layer, by a spin coat method in the same manner as the above-described first embodiment. Thus, a bonded-type optical disk 20 for use in both of the reproduction and the recording is obtained. Environmental tests are conducted using the adhesives listed in table 1 in the same manner as the first embodiment. Then, the same conclusion is confirmed that a product of Young's modulus and the film thickness, as one of characteristic values representing an adhesive, needs to be in a range of $1.0 \times 10^{-2}$ kg/mm to 3.0 kg/mm to satisfy the requirement that any possible change is suppressed within 0.2 degree in angular deviation.

Third Embodiment

A third embodiment specifies other characteristics of the adhesives applied to the previously-explained bonded-type optical disk 10.

TABLE 2

| Adhesive type | Young's modulus (kg/mm²) 55° C. | 70° C. | 80° C. | Thermal expansion coefficient ($\times 10^{-4}$ °C.$^{-1}$) 55° C. | 70° C. | 80° C. | Characteristic value ($\times 10^{-2}$ kg/mm² · °C.$^{-1}$) 55° C. | 70° C. | 80° C. |
|---|---|---|---|---|---|---|---|---|---|
| A2 | 1.3 | 1.4 | 1.5 | 7.5 | 9.6 | 10.8 | 0.1 | 0.13 | 0.16 |
| B2 | 12.0 | 7.0 | 5.0 | 4.1 | 7.4 | 11 | 0.49 | 0.52 | 0.55 |
| C2 | 40 | 3.9 | 2.5 | 2.1 | 22.6 | 38 | 0.84 | 0.88 | 0.95 |

TABLE 2-continued

| Adhesive type | Young's modulus (kg/mm$^2$) | | | Thermal expansion coefficient ($\times 10^{-4\circ}$ C.$^{-1}$) | | | Characteristic value ($\times 10^{-2}$ kg/mm$^2 \cdot$ °C$^{-1}$) | | |
|---|---|---|---|---|---|---|---|---|---|
| | 55° C. | 70° C. | 80° C. | 55° C. | 70° C. | 80° C. | 55° C. | 70° C. | 80° C. |
| D2 | 75 | 6.4 | 0.9 | 1.6 | 18.8 | 144 | 1.2 | 1.2 | 1.3 |
| E2 | 60 | 30 | 21 | 2.8 | 5.3 | 7.1 | 1.7 | 1.6 | 1.5 |
| F2 | 106 | 78 | 10.2 | 3.3 | 4.6 | 33.3 | 3.5 | 3.6 | 3.4 |
| G2 | 150 | 102 | 77.3 | 3.0 | 4.4 | 5.4 | 4.5 | 4.5 | 4.2 |
| H2 | 255 | 230 | 200 | 2.2 | 2.4 | 2.5 | 5.6 | 5.5 | 5.0 |

Various bonded-type optical disks 10, each having the arrangement shown in FIG. 1, were experimentally fabricated by changing the film thickness as a parameter, using UV hardening adhesives A2–H2 having properties listed in table 2. An angular deviation of each optical disk was measured at the room temperature (20° C.). Then, each optical disk was subjected to three kinds of environmental tests shown in table 2: condition #1 (temperature 55° C., humidity 95%, and 96 hours); condition #2 (temperature 70° C., humidity 90%, and 96 hours); and condition #3 (temperature 80° C., humidity 85%, and 96 hours). After finishing each environmental test, each disk was left alone for 24 hours under the condition of temperature 25° C. and humidity 50%. Then, the angular deviation of each disk was measured again to identify a change in the angular deviation before and after each environmental test.

A measuring device used for measuring the angular deviation is the type SH-3DL-12N of ADOMONT SCIENCE CO. having a measuring level for the angular deviation regulated in compliance with JIS S 8605. The deviation change amount was measured at the outermost position (i.e., at a radial position equivalent to the radius 58 mm) of each disk because the change of the angular deviation is maximized at the outermost position. The Young's modulus was measured in the following manner. Each adhesive, formed into a rectangular shape of 4 mm wide, 30 mm long, and 50 μm thick, was subjected to a tensile stress of 15±5 g under a heated condition. The relationship between an applied stress and a resultant deviation or distortion during this tensile test is measured by the thermal stress strain gauge (Type TMA/SS10 of SEIKO ELECTRON CO., LTD.). The Young's modulus of each adhesive is calculated based on the thus-identified relationship. The same thermal stress strain gauge was used to detect the thermal expansion coefficient; namely, an expansion amount is measured when a 1 mm-thick sample is subjected to a constant compression load of 3 g under a heated condition.

FIGS. 4A to 4C show graphs representing the relationships between characteristic values of the tested adhesives and detected changes in the angular deviation through the above-described environmental tests. As described previously, an acceptable deviation or distortion of the disk due to environmental changes is not larger than 0.2 degree in the angular deviation. To satisfy the requirement that any possible change in suppressed within 0.2 degree in angular deviation, it is confirmed from FIGS. 4A to 4C that a product of the thermal expansion coefficient and Young's modulus, as one of characteristic values representing an adhesive, needs to be in a range not larger than $1.5 \times 10^{-2}$ kg·mm$^{-2\cdot\circ}$ C.

Fourth Embodiment

Various optical disks 20, each having the arrangement shown in FIG. 2, are fabricated in the same manner as the above-described second embodiment. Environmental tests are conducted using the adhesives listed in table 2 in the same manner as the third embodiment. Then, the same conclusion is confirmed that a product of the thermal expansion coefficient and Young's modulus, as one of characteristic values representing an adhesive, needs to be in a range not larger than $1.5 \times 10^{-2}$ kg·mm$^{-2\cdot\circ}$ C.$^{-1}$ in order to suppress the change within 0.2 degree in angular deviation.

Fifth Embodiment

A fifth embodiment specifies still other characteristics of the adhesives applied to the previously-explained bonded-type optical disk 10.

TABLE 3

| Adhesive type | Thermal expansion coefficient ($\times 10^{-4\circ}$ C.$^{-1}$) | | | Film thickness (μm) | Characteristic value ($\times 10^{-5}$ mm/°C.) | | |
|---|---|---|---|---|---|---|---|
| | 55° C. | 70° C. | 80° C. | | 55° C. | 70° C. | 80° C. |
| A3 | 1.3 | 1.5 | 1.6 | 30 | 0.39 | 0.45 | 0.48 |
| | | | | 60 | 0.78 | 0.9 | 0.96 |
| | | | | 90 | 1.17 | 1.35 | 1.44 |
| | | | | 120 | 1.56 | 1.8 | 1.92 |
| | | | | 150 | 1.95 | 2.25 | 2.4 |
| B3 | 3.0 | 3.2 | 3.3 | 20 | 0.6 | 0.64 | 0.66 |
| | | | | 40 | 1.2 | 1.28 | 1.32 |
| | | | | 60 | 1.8 | 1.92 | 1.98 |
| | | | | 80 | 2.4 | 2.56 | 2.64 |
| | | | | 100 | 3.0 | 3.2 | 3.3 |
| C3 | 7.5 | 8.2 | 9.0 | 10 | 0.75 | 0.82 | 0.9 |
| | | | | 20 | 1.5 | 1.64 | 1.8 |
| | | | | 30 | 2.25 | 2.46 | 2.7 |
| | | | | 40 | 3.0 | 3.28 | 3.6 |
| | | | | 50 | 3.75 | 4.1 | 4.5 |

Various bonded-type optical disks 10, each having the arrangement shown in FIG. 1, were fabricated by changing the film thickness as a parameter, using UV hardening adhesives A3–C3 having different thermal expansion coefficients listed in table 3. An angular deviation of each optical disk was measured at the room temperature (20° C.). Then, each optical disk was subjected to three kinds of environmental tests shown in table 3: condition #1 (temperature 55° C., humidity 95%, and 96 hours); condition #2 (temperature 70° C., humidity 90%, and 96 hours); and condition #3 (temperature 80° C., humidity 85%, and 96 hours). After finishing each environmental test, each disk was left alone for 24 hours under the condition of temperature 25° C. and humidity 50%. Then, the angular deviation of each disk was measured again to identify a change in the angular deviation before and after each environmental test.

A measuring device used for measuring the angular deviation is the type SH-3DL-12N of ADOMONT SCIENCE CO. having a measuring level for the angular deviation regulated in compliance with JIS S 8605. The deviation change amount was measured at the outermost position (i.e., at a radial position equivalent to the radius 58 mm) of each disk because the change of the angular deviation is maximized at the outermost position. The thermal expansion coefficient is measured by using the thermal stress strain gauge (Type TMA/SS 10 of SEIKO ELECTRON CO., LTD.); namely, an expansion amount is measured when a 1 mm-thick hardened adhesive is subjected to a constant compression load of 3 g under a heated condition. In this case, the film thickness was controlled by adjusting the spinning speed and time.

Figure 5A:
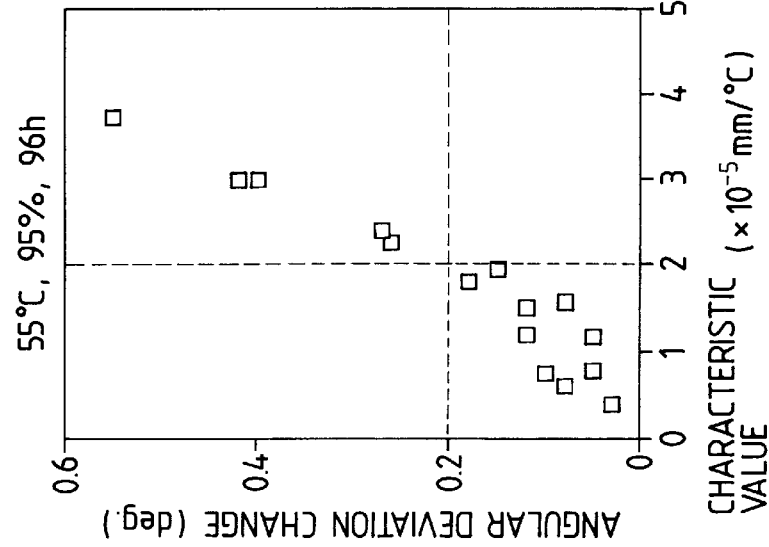
FIGS. 5A to 5C are graphs showing the resultant angular deviation changes in relation to the product of the thermal expansion coefficient and the film thickness, for adhesives used for bonded-type optical disks.
Figure 5B:
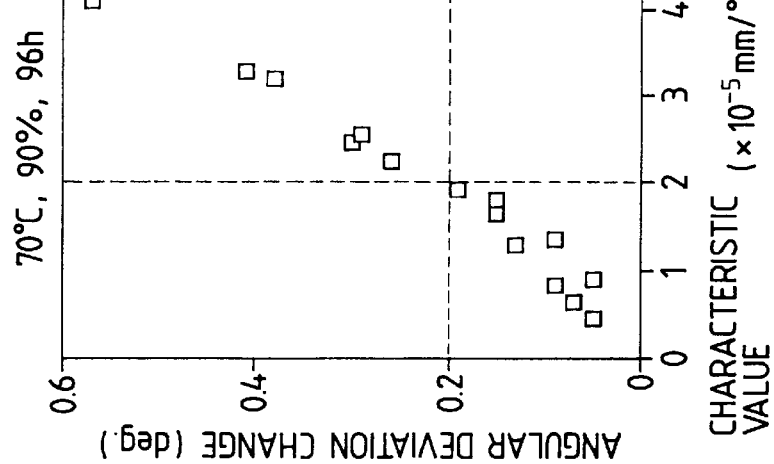
Figure 5C:
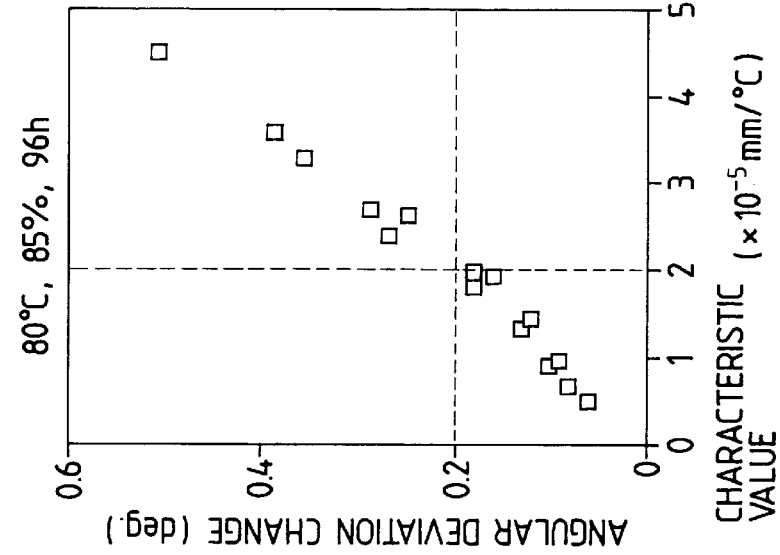
Figure 6C:
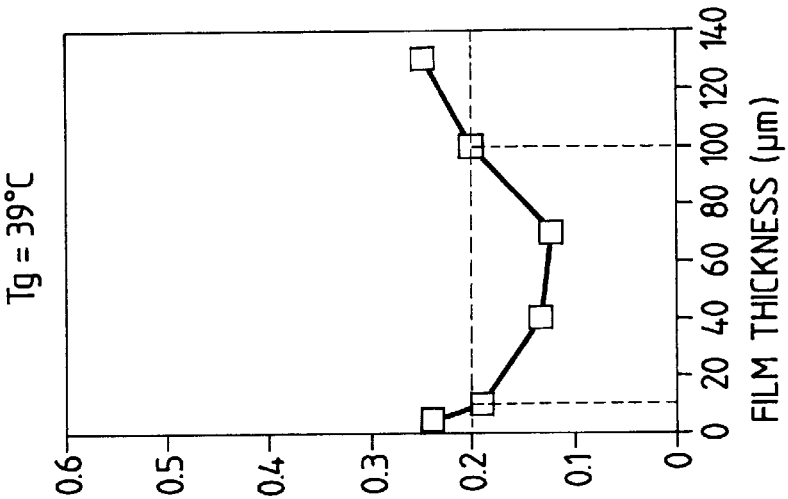
Figure 6B:
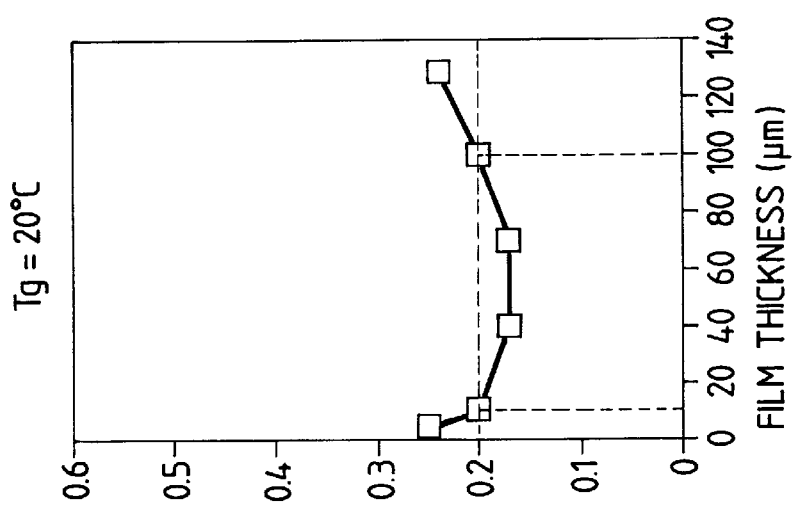
Figure 6A:
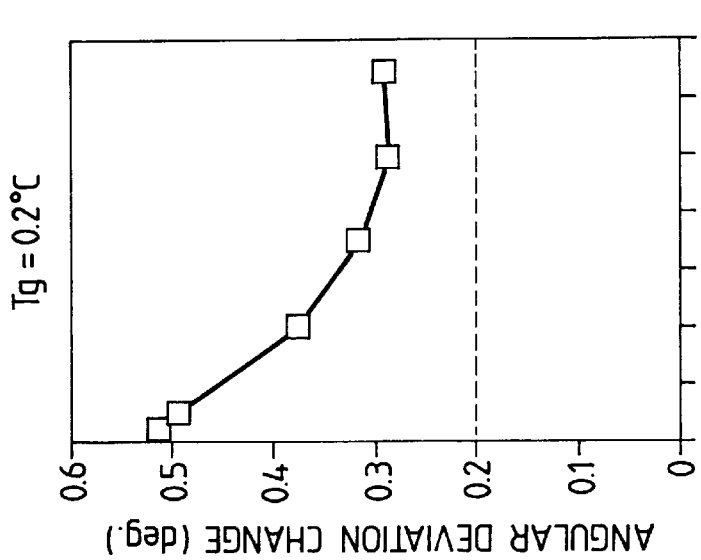

FIGS. 5A to 5C show graphs representing the result of angular deviation changes obtained through the above-described environmental tests. As described previously, an acceptable deviation or distortion of the disk due to environmental changes is not larger than 0.2 degree in the angular deviation. To satisfy the requirement that any possible change is suppressed with in 0.2 degree in angular deviation, it is confirmed from FIGS. 5A to 5C that a product of the thermal expansion coefficient and the film thickness, as one of characteristic values representing an adhesive, needs to be in a range not larger than $2.0 \times 10^{-5}$ mm/°C.

Sixth Embodiment

Various optical disks 20, each having the arrangement shown in FIG. 2, are fabricated in the same manner as the second embodiment. Environmental tests are conducted using the adhesives listed in table 3 in the same manner as the fifth embodiment. Then, the same conclusion is confirmed that a product of the thermal expansion coefficient and the film thickness, as one of characteristic values representing an adhesive, needs to be in a range not larger than $2.0 \times 10^{-5}$ mm/°C. in order to suppress the change within 0.2 degree in angular deviation.

Seventh Embodiment

A seventh embodiment specifies yet other characteristics of the adhesives applied to the previously-explained bonded-type optical disk 10.

TABLE 4

| Adhesive type | Tg (°C.) | Film thickness ($\mu$m) | Angular deviation change (deg.) | Adhesive type | Tg (°C.) | Film thickness ($\mu$m) | Angular deviation change (deg.) |
|---|---|---|---|---|---|---|---|
| A4 | 0.2 | 5 | 0.52 | D4 | 61 | 5 | 0.23 |
|  |  | 10 | 0.50 |  |  | 10 | 0.17 |
|  |  | 40 | 0.38 |  |  | 40 | 0.08 |
|  |  | 70 | 0.32 |  |  | 70 | 0.09 |
|  |  | 100 | 0.28 |  |  | 100 | 0.15 |
|  |  | 130 | 0.24 |  |  | 130 | 0.21 |
| B4 | 20 | 5 | 0.25 | E4 | 80 | 5 | 0.35 |
|  |  | 10 | 0.20 |  |  | 10 | 0.20 |
|  |  | 40 | 0.17 |  |  | 40 | 0.18 |
|  |  | 70 | 0.17 |  |  | 70 | 0.18 |
|  |  | 100 | 0.20 |  |  | 100 | 0.20 |
|  |  | 130 | 0.24 |  |  | 130 | 0.29 |
| C4 | 39 | 5 | 0.24 | F4 | 92 | 5 | 0.25 |
|  |  | 10 | 0.19 |  |  | 10 | 0.30 |
|  |  | 40 | 0.13 |  |  | 40 | 0.32 |
|  |  | 70 | 0.12 |  |  | 70 | 0.38 |
|  |  | 100 | 0.17 |  |  | 100 | 0.40 |
|  |  | 130 | 0.25 |  |  | 130 | 0.45 |

Various bonded-type optical disks 10, each having the arrangement shown in FIG. 1, were fabricated by changing the film thickness as a parameter, using a plurality of hardening adhesives A4–F4 having different glass transition points (hereinafter abbreviated Tg) listed in table 4. An angular deviation of each optical disk was measured at the room temperature (20° C.). Then, each optical disk was subjected to the environmental test under the condition of temperature 80° C., humidity 85%, and 96 hours. After finishing the environmental test, each disk was left alone for 24 hours under the condition of temperature 25° C. and humidity 50%. Then, the angular deviation of each disk was measured again to identify a change in the angular deviation before and after each environmental test.

A measuring device used for measuring the angular deviation is the one having a measuring level for the angular deviation regulated in compliance with JIS S 8605. The deviation change amount was measured at the outermost position (i.e., at a radial position equivalent to the radius 58 mm) of each disk because the change of the angular deviation is maximized at the outermost position. The DSC(i.e., Differential Scanning Calorimetry) method is used to obtain the value of Tg. The thermal variation of Young's modulus was measured in the following manner. Each adhesive, formed into a rectangular shape of 4 mm wide, 30 mm long, and 50 $\mu$m thick, was subjected to a tensile stress of 15±5 g under a heated condition. The relationship between an applied stress and a resultant deviation or distortion during this tensile test is measured by the thermal stress strain gauge (Type TMA/S S10 of SEIKO ELECTRON CO., LTD.). The Young's modulus of each adhesive is calculated based on the thus-identified relationship. In this case, the film thickness was controlled by adjusting the spinning speed and time.

Table 4 and FIGS. 6A–6F cooperatively show the result of angular deviation changes obtained through the above-described environmental test. As described previously, an acceptable deviation or distortion of the disk due to environmental changes is not larger than 0.2 degree in the angular deviation. To satisfy the requirement that any possible change is suppressed within 0.2 degree in angular deviation, it is confirmed from FIGS. 6A to 6F that the adhesive needs to have Tg in a range of 20° C. to 80° C. and the film thickness needs to be in a range of 10 $\mu$m to 100 $\mu$m.

Eight Embodiment

Figure 7A:
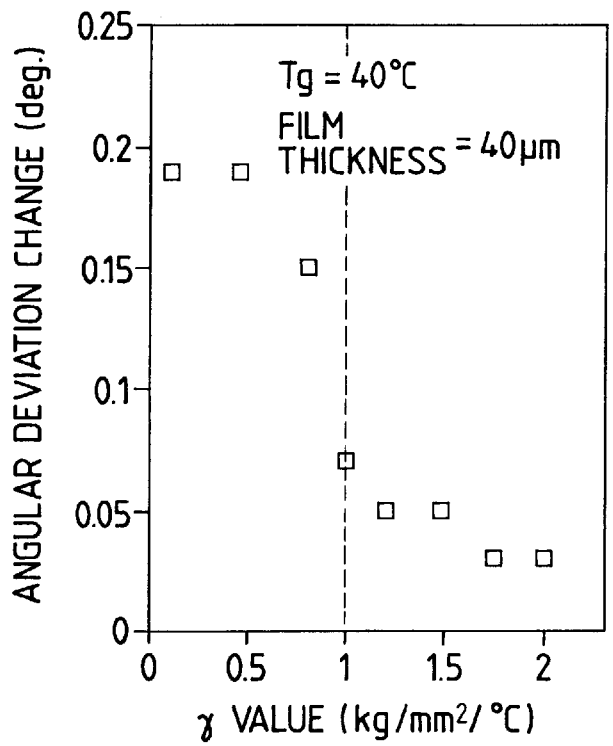
FIGS. 7A and 7B are graphs showing the resultant angular deviation changes in relation to γ value of the bonded-type optical disk.
Figure 7B:
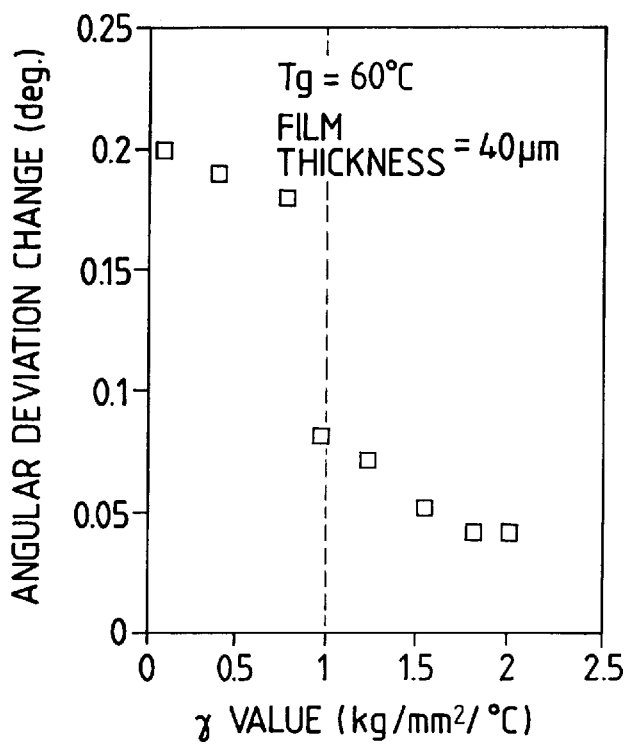
Figure 8:
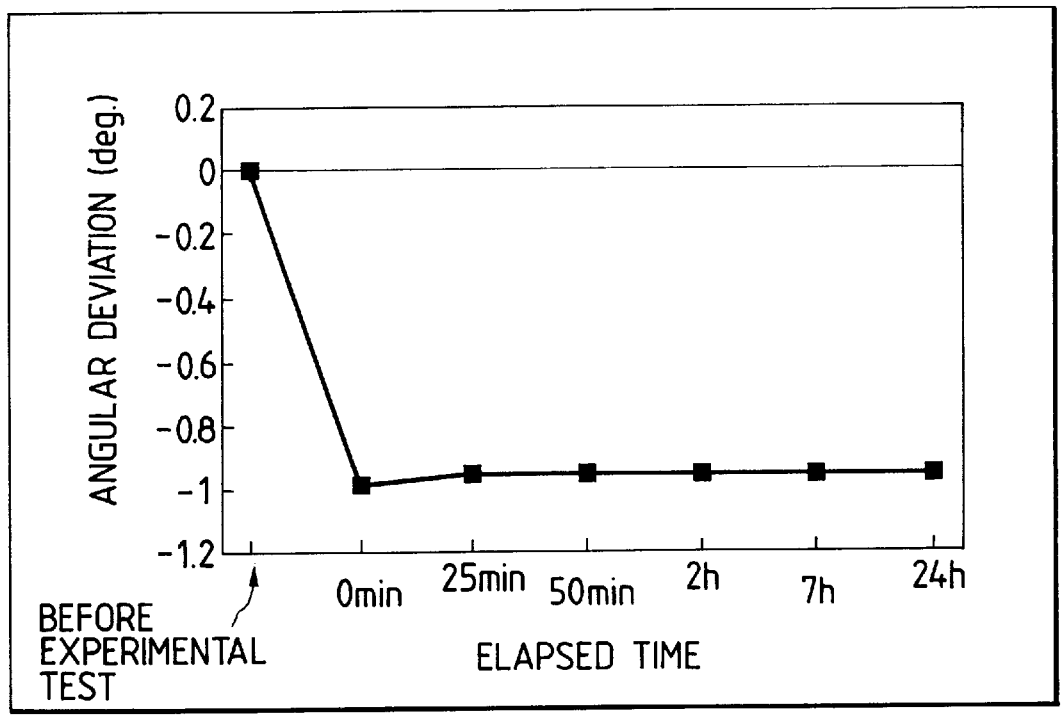
FIG. 8 is a graph showing a time variation of an angular deviation in a conventional bonded-type optical disk.
Figure 9:
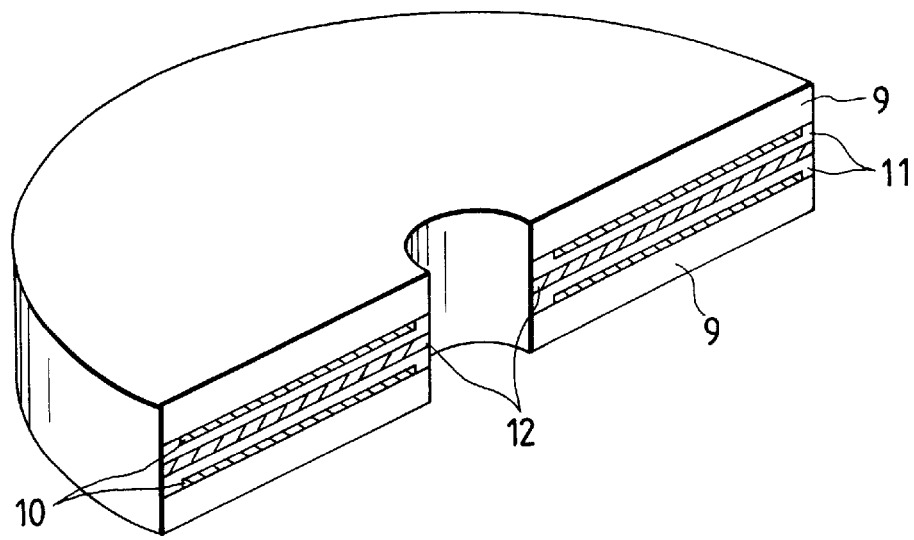
FIG. 9 is a perspective cross-sectional view schematically showing an arrangement of a conventional bonded-type optical disk.
Figure 10A:
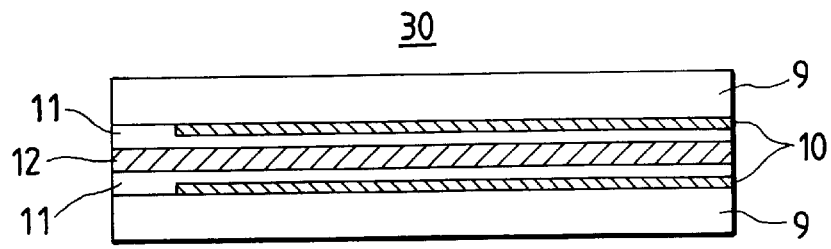
FIGS. 10A and 10B are cross-sectional views schematically showing the arrangement of the conventional bonded-type optical disk.
Figure 10B:
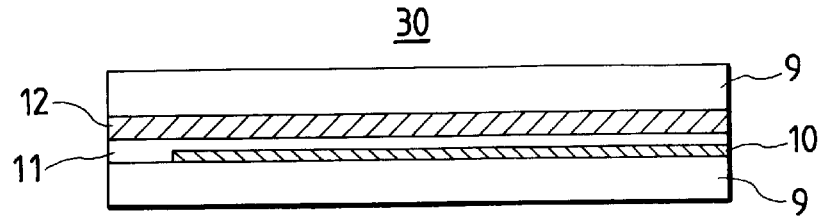

A group of adhesives, having the same Tg of about 40° C. but different in the mean gradient (referred to "$\gamma$ value", hereinafter) in the thermal variation of Young's modulus, and another group of adhesives, having the same Tg of about 60° C. but different in the $\gamma$ value, are both subjected to environmental tests similar to the seventh embodiment. FIGS. 7A and 7B show the result obtained through these experiments. And, it is confirmed from FIGS. 7A and 7B that the change in the angular deviation can be further suppressed effectively when the $\gamma$ value exceeds $-1.0$ kg/mm$^2$/°C.

Ninth Embodiment

Various optical disks 20, each having the arrangement shown in FIG. 2, are fabricated in the same manner as in the second embodiment. Environmental tests are conducted using the adhesives listed in table 4 in the same manner as the seventh embodiment. Then, the same conclusion is confirmed that the adhesive needs to have Tg in a range of 20° C. to 80° C. and the film thickness needs to be in a range of 10 $\mu$m to 100 $\mu$m in order to suppress the change within 0.2 degree in angular deviation. Furthermore, these adhesives are subjected to the experiments conducted in the eighth embodiment. And, as a result, it is confirmed that the change in the angular deviation can be further suppressed effectively when the $\gamma$ value exceeds $-1.0$ kg/mm$^2$/°C.

Regarding the structural features of the bonded-type optical disks, the disks disclosed in the present invention are not so different from those of the conventional ones. The substrate is a transparent plastic or glass, such as polycarbonate, poly(methyl methacrylate) (=PMMA), epoxy, amorphous polyolefine. Regarding the recording layer for the reproduction only type optical disk, the metallic reflective film, such as Al, Au, Pt, Cu and Ag, and its alloy film are formed on the signal-pits formed surface of the substrate by the injection molding or the like. Regarding the recording layer for a write-once type optical disk, a cyanine-group or phthalocyanine-group organic dye film is formed on the guide groove which is generally referred to as "groove". Then, the metallic reflective film, such as Al, Au, Cu and Ag, and its alloy film are formed on this organic dye film.

In the case of the recording/reproduction type optical disk, the first dielectric layer, the recording layer and the second dielectric layer, if necessary together with the reflective layer and the organic resin protection layer, are accumulated in this order on the groove. The dielectric layer may be constituted by AlNx, SiO2, SiNx, ZnS etc. The recording layer may be constituted by a photoelectromagnetic recording material, such as FeTh, FeTbCo, FeTbGd, GdCo and MnCuBi., or by a phase-change recording material, such as As—Te—Ge group and Sn—Te—Se group. The organic resin protection layer may be constituted chiefly by a ultraviolet hardening resin, such as epoxy acrylate, urethane acrylate and polyester acrylate. Regarding the film forming method used in the present invention, appropriate methods can be arbitrarily chosen from the conventionally well-known methods, such as sputtering, vacuum deposition, ion plating, plasma vapor deposition, electroless plating and spin coat methods.

A bonded-type optical disk of the present invention is manufactured by bonding the faces of two opposed recording-layer provided substrates using an adhesive, or by bonding the faces of a recording-layer provided substrate and a recording-layer-less substrate using an adhesive. The type of an adhesive used for the present invention is not limited to the specific ones; therefore, the generally well-known adhesives, such as hotmelt type or ultraviolet hardening type, can be used.

In the case of the hotmelt type adhesive, it may be preferable to use a polyamide group, a polyester group, a polyurethane group, a polyolefine group or other hardening type responsive to the moisture, although not limited to them. In the case of the ultraviolet hardening type adhesive, it is preferable to use a polymerizable compound having at least one ethylenic linkage in the molecule, such as polyester (metha) acrylate, polyether (metha) acrylate, polyurethane (metha) acrylate, epoxy (metha) acrylate which are classified into a crosslinking oligomer group, or single, double, triple or more functional (metha) acrylate. For example, as a triple or more functional (metha) acrylate, it is preferable to use trimethylolpropanetri (metha) acrylate and dipentaerythritolhexaacrylate by alone or as a compound blended by an appropriated ratio. As a double-functional (metha) acrylate, it is preferable to use caprolactam modified hydroxy pivalic acid neopentyl grycol diactylate and dicyclopentanyl diacrylate. As a single-functional (metha) acrylate, it is preferable to use 2-hydroxy-3-phenoxypropylacrylate. The materials are not limited to the above-described ones, therefore any other materials can be used if they satisfy the characteristic parameters specified by the present invention.

Furthermore, the bonding method is not limited to a specific one. For example, for a hotmelt type optical disk, a roll coat method will be preferably used. For a ultraviolet type optical disk, a conventional method selected from the group consisting of a spin coat method, a screen printing method and a roll coat method will be preferably used.

The above embodiments disclose the results obtained based on the three kinds of operating temperature regions (20° C.–55° C., 20° C.–70° C., 20° C.–80° C.). Needless to say, the operating temperature ranges are not limited to them. In general, the quality of products should be guaranteed against any possible environmental changes in operation, including the winter-time use in the under-freezing-point regions and the summer-time use in vehicles higher than 80° C. Thus, it is needless to say that Young's modulus and the film thickness of an adhesive should be determined properly in accordance with the designated operating temperature range.

Furthermore, regarding the type of adhesive, it is not limited to the hotmelt type or the ultraviolet hardening type. From the object of the present invention, it will be apparent that any other type adhesives can be used if they satisfy the above-specified numerical conditions of the present invention. For example, double-liquid type epoxy group adhesives, anaerobic adhesives, primer hardening-type adhesives, and cyanoacrylate-group adhesives can be used.

Furthermore, according to the above-described embodiments, the recording layer is provided on one side of the substrate. However, it is of course possible to provide the recording layer to each of transparent substrates constituting an optical disk so that these two substrates are united with the recording-layer formed faces bonded via an adhesive layer.

As explained in the foregoing description, the present invention makes it possible to minimize the deviation or distortion in an optical recording disk by setting the characteristic parameters of the used adhesive properly at its operating temperature, more specifically, by setting the product of Young's modulus and the film thickness in a range of $1.0 \times 10^{-2}$ kg/mm to 3.0 kg/mm, or by setting the product of Young's modulus and the thermal expansion coefficient in a range not larger than $1.5 \times 10^{-2}$ kg·mm$^{-2}$·°C.$^{-1}$, or by setting the product of the thermal expansion coefficient and the film thickness in a range not larger than $2.0 \times 10^{-5}$ mm /°C., or by setting the glass transition point in a range of 20° C. to 80° C. in addition to the film thickness in a range of 10 μm to 100 μm. Thus, it becomes possible to provide an optical recording disk accurate in the physical properties and excellent in quality. Furthermore, when the glass transition point of the adhesive is set in the range of 20° C. to 80° C. and the film thickness is set in the range of 10 μm to 100 μm, the deviation or distortion of the optical disk can be effectively suppressed by setting the mean gradient into the range exceeding −1.0 kg/mm$^2$/°C. in the thermal variation of the Young's modulus of the adhesive.

As this invention may be embodied in several forms without departing from the spirit of essential characteristics thereof, the present embodiment as described is therefore intended to be only illustrative and not restrictive, since the scope of the invention is defined by the appended claims rather than by the description preceding them, and all changes that fall within the metes and bounds of the claims, or equivalents of such metes and bounds, are therefore intended to be embraced by the claims.

What is claimed is:

1. An asymmetric optical disk comprising two opposed transparent substrates bonded by an adhesive layer interposed therebetween, wherein each of said two opposed transparent substrates have a common thickness of 0.6 mm with one transparent substrate having an information recording layer of a metallic film or organic dye formed on an upper surface thereof and with the other transparent substrate having no information recording layer on an upper surface thereof, so that the information recording layer is sandwiched asymmetrically between said opposed transparent substrates, said optical disk exhibiting an angular deviation of less than 0.2 degrees when subjected to environmental testing under temperature conditions between 55° C. and 80° C., and humidity conditions between 85% and 95% over a time duration of 96 hours and characterized in that a product of the Young's modulus of said adhesive and the film thickness of said adhesive layer is in a range of $1.0 \times 10^{-2}$ kg/mm to 3.0 kg/mm.

2. An asymmetric optical disk comprising two opposed transparent substrates bonded by an adhesive layer interposed therebetween, wherein each of said two opposed transparent substrates have a common thickness of 0.6 mm with one transparent substrate having an information recording layer of a metallic film or organic dye formed on an upper surface thereof and with the other transparent substrate having no information recording layer on an upper surface thereof, so that the information recording layer is sandwiched asymmetrically between said opposed transparent substrates, said optical disk exhibiting an angular deviation of less than 0.2 degrees when subjected to environmental testing under temperature conditions between 55° C. and 80° C., and humidity conditions between 85% and 95% over a time duration of 96 hours and characterized in that a product of the thermal expansion coefficient and Young's modulus of said adhesive is not larger than $1.5 \times 10^{-2}$ kg·mm$^{-2}$° C.$^{-1}$.

3. An asymmetric optical disk comprising two opposed transparent substrates bonded by an adhesive layer interposed therebetween, wherein each of said two opposed transparent substrates have a thickness of 0.6 mm and one transparent substrate having an information recording layer of a metallic film or organic dye formed on an upper surface thereof and with the other transparent substrate having no information recording layer on an upper surface thereof, so that the information recording layer is asymmetrically sandwiched between said opposed transparent substrates, said optical disk exhibiting an angular deviation of less than 0.2 degrees when subjected to environmental testing under temperature conditions between 55° C., and 80° C., and humidity conditions between 85% and 95% over a time duration of 96 hours and characterized in that a product of the thermal expansion coefficient of said adhesive and the film thickness of said adhesive layer is not larger than $2.0 \times 10^{-5}$ mm/°C.

4. An asymmetric optical disk comprising two opposed transparent substrates bonded by an adhesive layer interposed therebetween, wherein each of said two opposed transparent substrates have a common thickness of 0.6 mm with one transparent substrate having an information recording layer of a metallic film or organic dye formed on an upper surface thereof and with the other transparent substrate having no information recording layer on an upper surface thereof, so that the information recording layer is asymmetrically sandwiched between said opposed transparent substrates, said optical disk exhibiting an angular deviation of less than 0.2 degrees when subjected to environmental testing under temperature conditions between 55° C. and 80° C., and humidity conditions between 85% and 95% over a time duration of 96 hours and characterized in that the glass transition point of said adhesive is in a range of 20° C. to 80° C. and the film thickness of said adhesive layer is in a range of 10 μm to 100 μm.

5. The optical disk in accordance with claim 4, wherein a mean gradient in a thermal variation of Young's modulus of said adhesive is not smaller than $-1.0$ kg/mm$^2$/°C.

6. An asymmetric optical disk comprising two opposed substrates bonded to one another by an adhesive layer interposed therebetween whose characteristic parameters are set in predetermined ranges, so as to satisfy at least one of the following conditions (A) to (D):

(A) a product of Young's modulus of an adhesive used for bonding said opposed transparent substrates and a film thickness of said adhesive layer is in a range of $1.0 \times 10^{-2}$ kg/mm to 3.0 kg/mm;

(B) a product of a thermal expansion coefficient aid Young's modulus of the adhesive used for bonding said opposed transparent substrates is in a range not larger than $1.5 \times 10^{-2}$ kg·mm$^{-2}$°C.$^{-1}$;

(C) a product of a thermal expansion coefficient of the adhesive used for bonding said opposed transparent substrates and the film thickness of said adhesive layer is in a range not larger than $2.0 \times 10^{-5}$ mm/°C.

(D) a glass transition point of the adhesive used for bonding said opposed transparent substrates is in a range of 20° C. to 80° C. and the film thickness of said adhesive layer is in a range of 10 μm to 100 μm and with each opposed substrate having a thickness of 0.6 mm such that said optical disk exhibits an angular deviation of less than 0.2 degrees when subjected to environmental testing under temperature conditions between 55° C. and 80° C. and humidity conditions between 85% and 95% over a time duration of 96 hours.

* * * * *